United States Patent [19]
Elberbaum

[11] Patent Number: 5,923,363
[45] Date of Patent: Jul. 13, 1999

[54] APPARATUS FOR POWERING A TELEVISION INTERPHONE MONITOR VIA A SIGNAL TRANSMISSION LINE

[75] Inventor: David Elberbaum, Tokyo, Japan

[73] Assignee: Elbex Video Ltd., Tokyo, Japan

[21] Appl. No.: 08/812,250

[22] Filed: Mar. 6, 1997

[51] Int. Cl.$^6$ .............................. H04N 7/18; H04M 11/04
[52] U.S. Cl. .......................... 348/156; 348/152; 348/153; 348/159; 340/310.01; 340/310.06
[58] Field of Search ..................................... 348/155, 156, 348/143, 152, 153, 154; 379/102.06; 455/456; 340/310.01, 310.06; H04N 7/18; H04M 11/04

[56] References Cited

U.S. PATENT DOCUMENTS

| | | | |
|---|---|---|---|
| 4,370,675 | 1/1983 | Cohn | 358/108 |
| 4,868,815 | 9/1989 | Iwamura et al. | 370/71 |
| 5,032,820 | 7/1991 | Tanikawa et al. | 340/310.6 |
| 5,428,388 | 6/1995 | Von Bauer et al. | 348/155 |
| 5,612,994 | 3/1997 | Chen | 379/167 |

*Primary Examiner*—Bryan Tung
*Assistant Examiner*—Nhon T. Diep
*Attorney, Agent, or Firm*—Helfgott & Karas, PC.

[57] ABSTRACT

In an apparatus for powering a television interphone monitor for communication between entrances of a building and individual apartment of the building, power is fed to the television interphone monitor which is operated by a rechargeable battery, through a transmission line which is of low cost. The apparatus includes a single entrance panel or a number of entrance panels each of which has a TV camera and a circuit for processing an electrical information signal which may include a video signal. One or a number of television interphone monitors are connected via respective transmission lines to power supply units which may be included in an entrance unit which is in turn connected to the entrance panels. The power supply units supply a regulated current to the rechargeable battery. The entrance unit also includes a circuit for feeding an information signal to the television interphone monitors and a circuit for receiving the information signal from the television interphone telephones through corresponding transmission lines. Switching circuits may be provided between the entrance unit and the television interphone monitors to connect any one of the monitors to one or another entrance panel.

27 Claims, 8 Drawing Sheets

APPARATUS FOR POWERING A TELEVISION INTERPHONE MONITOR VIA A SIGNAL TRANSMISSION LINE

BACKGROUND OF THE INVENTION

1. Field of the Invention

This invention relates to a television interphone apparatus provided for communication between building entrances and individual apartments of the building, along with transmission of visitor's pictures to a monitor mounted on the wall of the apartment.

2. Description of the Prior Art

A television interphone monitor used for entrance monitoring and communication is mounted on a wall inside the apartment and is wired via multi-core cables for connecting to each other different elements of the system, such as a microphone and speaker wires, a coax cable for video signals, a door release wire, a calling wire and an alarm wire. Whenever a more complex system is installed such as for multi-entrances or as concierge station systems the wiring becomes very complex and costly.

Such a television interphone monitor unit mounted on the wall of the individual apartment requires an individual power supply having sufficient capacity to power the monitor and the interphone. Since multi-television interphone monitor units are assembled into an apartment block, such system requires extensive wiring and cabling along with a large number of power supplies and heavy power wires for connecting many power supplies to many television monitor units, which is laborious and costly.

Such television interphone monitors may be powered from a central power supply which requires a large power capacity and exclusive heavy gauge wires to connect the power supply to each television interphone monitor. It would be advantageous to feed the power through a signal transmission line. However, as the television monitor circuits consume most of the power needed for operating the television interphone monitor unit and as the monitor operates at random, the current consumed by the television interphone monitor is not constant and therefore if the power to the television interphone monitor is fed through the transmission line it will disturb the flow of signals.

On the other hand, an apparatus for powering television cameras via the camera transmission line along with transmitting audio, I.D. and control signals through a common transmission line is disclosed in copending U.S. patent application Ser. No. 08/803,616 dated Feb. 21, 1997.

SUMMARY OF THE INVENTION

An object of the present invention is to provide an apparatus for powering a television interphone monitor via a low cost transmission line such as twisted pair, extending between the television interphone monitor and the entrance unit, for transmitting a video signal generated by the television camera of the entrance panel along with a two-way audio signal, a control signal, an alarm signal and other communication signals.

An apparatus for powering a television interphone monitor via low cost transmission lines according to the present invention comprises a single entrance panel or a plurality of entrance panels, each of which may comprise a television camera and each processing an electrical information signal which may include a video signal, a single television interphone monitor or a plurality of television interphone monitors for communication with and observing the visitors, a single transmission line or a plurality of transmission lines for connecting each television interphone monitor with an entrance unit or directly with the single entrance panel or the plurality of entrance panels, a single power supply unit or multiple power supply units for powering the television interphone monitors via the transmission lines and the entrance unit.

The entrance unit includes a circuit for feeding an information signal to a television interphone monitor and a circuit for receiving the information signal from the television interphone monitors through corresponding transmission lines. The entrance unit and the television interphone monitors may be connected through switching circuits for connecting any one of the entrance panels to any one of the television interphone monitors or switching over from one entrance panel to another or from one television interphone monitor to another.

The entrance unit incorporates a single current supply means or a plurality of current supply means for feeding regulated current to each television interphone monitor through a corresponding transmission line which also transmits the two-way information signal between the entrance unit and each of the television interphone monitors.

The current supply means incorporate a signal separation/injection circuit to inject video signals generated by the television camera along with audio, control and alarm signals for propagating combined signals through the transmission line to the television interphone monitor. As the signals are mutually injected into the transmission line they become a combined information signal propagated between the entrance panels and the television interphone monitors. A signal separation/injection circuit can be installed in the switching circuits to inject or separate the information signals from the transmission line processed by the switching circuit, or multiple separation/injection circuits can be incorporated one per each current supply means.

The separation/injection circuit also separates the information signal fed by the television interphone monitor through the transmission line from the DC components present on the transmission line and feeds the separated information signal to the receiving circuit of the entrance unit. The receiving circuit comprises decoding/demodulating circuits for feeding the audio, control and alarm signals to the respective circuits.

The power fed to each television interphone monitor through the transmission line is a regulated current and is maintained at a predetermined level by a current control circuit incorporated in the current supply means. The predetermined current is the sum of the controlled current or a standby current consumed by the interphone circuits and additional current fed to a rechargeable battery connected to the television interphone monitor. The charged battery provides the energy for operating the television monitor circuits with sufficient capacity to drive the current drain of the monitor circuits and/or any current surge. Therefore the monitor can be switched on and operated by the charged battery without disturbing the propagated signals through the corresponding transmission line. The charged battery can also power the interphone circuits when the constant current fed to the television interphone monitor is cut or switched off.

Each television interphone monitor further incorporates a signal combining circuit to process and combine the audio, control and alarm signals generated by the television interphone monitor, and an injection circuit to inject the combined signals that form an information signal into the transmission line connecting the television interphone monitor with the entrance unit.

Each television interphone monitor incorporates a DC separation circuit to separate the DC from the information signal generated by the entrance unit and feed the information signal to a signal processing circuit. The separated DC is fed to the rechargeable battery through a battery control circuit, while a standby current for operating the interphone circuits is drawn from the charged battery through a standby output terminal of the battery control circuit. Alternatively, the separated DC is fed to the interphone circuits via the current control circuit and to the rechargeable battery through a battery control circuit. The signal processing circuit further incorporates a retrieving circuit for retrieving video, audio and control signals and feeding the retrieved signals to the respective circuits. The battery control circuit consists of a polarity check circuit, a discharge check circuit and a disconnection check circuit for verifying the battery polarity, a charge state or disconnection for activating a charge current cutout switch to prevent a battery damage when a battery is reversely connected or activate a monitor power cutout switch to prevent interference with the flow of information signals when the battery is disconnected or discharged.

The interphone television monitor of the present invention may further comprise a control circuit for generating and feeding a control signal consisting of a coded control command such as a code for controlling the entrance door lock and/or a code for controlling the elevators, or a code for controlling the lighting of corridors and the entrance. The coded control command way include alarm signals for alerting a concierge counter or a security attendant. The coded control command may also include a switch-on control command for connecting the television interphone monitor with any of the entrance panels or switching over from one entrance panel to another or for connecting the television interphone monitor with a concierge counter or with a security room or activate an automatic telephone dialer for transferring alarm messages to authorities via public telephone lines.

The coded control signals may use a binary code or digital codes consisting of high-low or narrow-wide pulses or use dual tone signals used for a digital telephone, or use a specific frequency or a pulse count, or a mixture of different pulses and frequencies for a given control command. The coded control can be AM or FM and combined into the audio frequency range and mixed with the audio signals propagated between the television interphone monitor and the entrance unit.

Similar or identical coded control signals are also generated by the entrance unit or the entrance panel for controlling individual functions related to each television interphone monitor, such as ringing, switching the monitor on, a fire alarm annunciation, a general alarm annunciation, switching the lighting of corridors on-off, or blocking the elevators and/or many other coded controls for operating functions of a concierge and/or alarm attendant for an apartments' building or a block.

The video signals generated by the television camera may be converted into differential signals for propagation via low cost transmission lines such as a twisted pair and may be processed into digital video signals, or modulated onto a carrier frequency.

The audio signals along with the control signals and alarm signals generated by the entrance panel or the entrance unit and the television interphone monitor may also be converted into differential signals or digital signals and may be AM or FM modulated onto a carrier frequency having a frequency higher or lower than the video frequency and propagated through the transmission line connecting the television interphone monitor to the entrance unit. The audio signals along with the control and alarm signals may also be compressed and fed into the video signal during the vertical blanking period.

According to the preferred embodiment of the present invention the video signals and the audio signals along with alarm signals and control signals can be bi-directionally transmitted through a low cost transmission line extending between the entrance panel and the television interphone monitor while the current supply means feeds regulated current through same low cost transmission line to operate the interphone portion of a television interphone monitor and to charge a battery for operating the monitor portion of the television interphone monitor.

BRIEF DESCRIPTION OF THE DRAWINGS

The foregoing objects and features of the present invention will become apparent from the following description of preferred embodiments of the invention with reference to the accompanying drawings, in which.

DETAILED DESCRIPTION OF THE PREFERRED EMBODIMENTS

Figure 1:
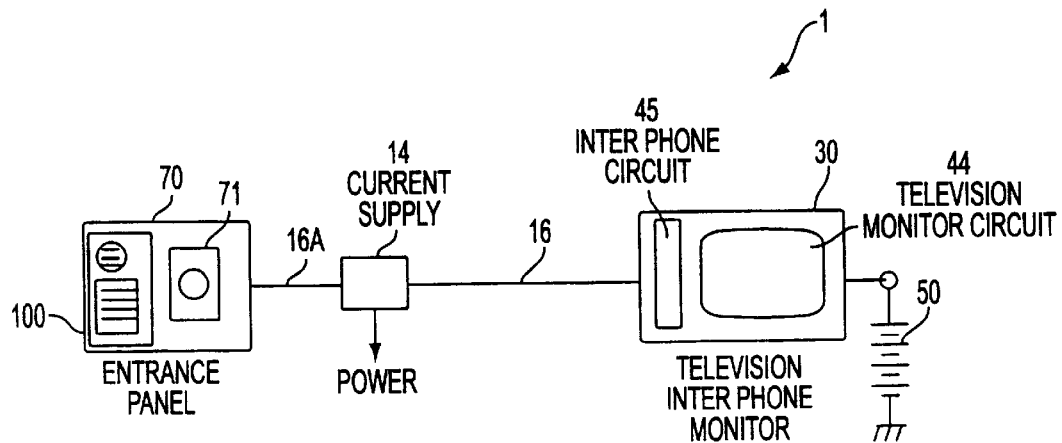
FIG. 1 is a block diagram of an apparatus for powering a television interphone monitor via an information transmission line according to a preferred embodiment of the present invention.

FIG. 1 shows an apparatus for powering a single television interphone monitor via an information signal transmission line as a preferred embodiment when applying the present invention to a television interphone monitoring system. An information signal in the following description may consist of audio signals only, or a combination of video, audio and/or code signals propagated from the entry site to the television interphone monitor, along with audio and control signals propagated from the television interphone monitor to the entry site. A video signal in the following description may be a video portion of a composite video signal or a composite video signal or a digital video signal.

Referring to FIG. 1, the apparatus for powering a television interphone monitor 30 comprises an entrance panel 70 incorporating a television camera 71 for transmitting and receiving an information signal and a controller 100, a current supply unit 14 for receiving and transferring the information signals to and from the entrance panel 70 and for supplying a regulated current to power the television interphone monitor 30, a transmission line 16 for propagating information signals between the television interphone monitor 30 and the current supply unit 14 and for carrying the regulated current from the current supply unit 14 to the television interphone monitor 30, a transmission line 16A for propagating information signals between the power supply unit 14 and the entrance panel 70, a television monitor circuit 44 with a display for displaying video images, a rechargeable battery 50 for providing the energy source needed for operating the monitor, and an interphone circuit 45 for receiving and generating information signals.

Figure 2:
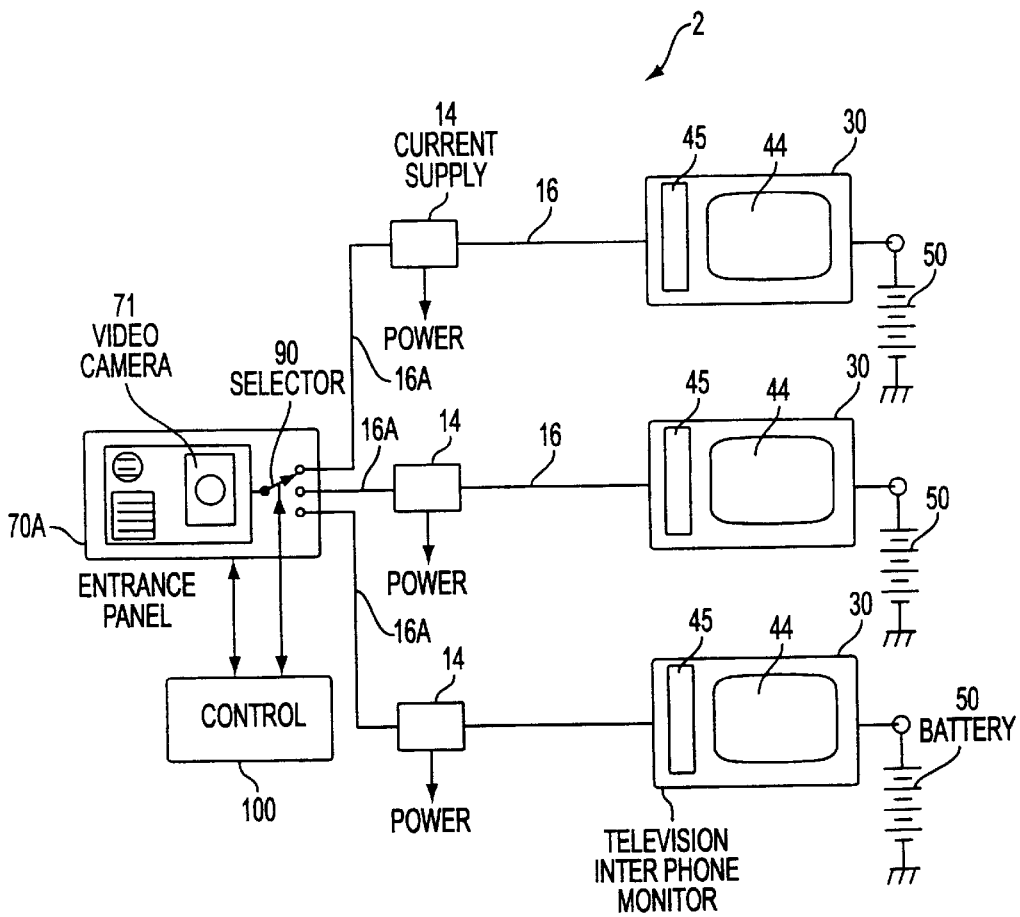
FIG. 2 is a block diagram of an apparatus for powering multiple television interphone monitors through their respective information transmission lines when the apparatus is applied to a monitoring system having a single entrance panel.

FIG. 2 shows an apparatus 2 for powering a plurality of television interphone monitors 30 by a plurality of current supply units 14 via a plurality of information signal transmission lines 16 as a preferred embodiment when applying the present invention to a television interphone monitoring system comprising the single entrance panel 70A. Referring to FIG. 2, each of the television interphone monitors 30 is connected to its own rechargeable battery 50 to power its own monitor 30, an entrance panel 70A for transmitting and receiving information signals, a selector 90 having its poles connected via transmission lines 16A to the plurality of current supply units 14 for connecting through selector 90 any of the transmission lines 16A to the circuits of the entrance panel 70A and a controller 100 for controlling selector 90 and for generating control or alarm signals.

Figure 3:
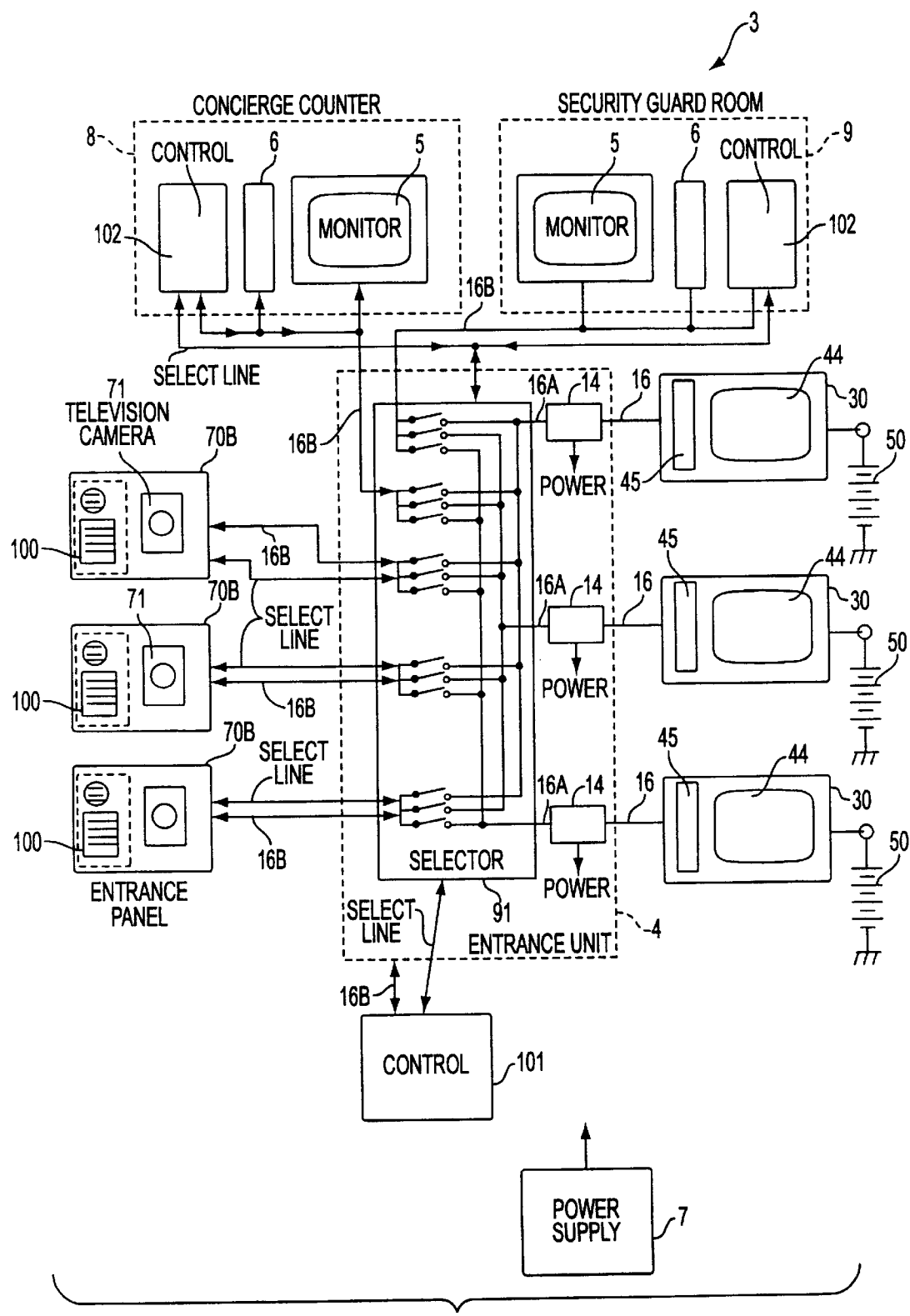
FIG. 3 is a block diagram of an apparatus for powering of multiple television interphone monitors through their respective information transmission lines when the apparatus is applied to the monitoring system having a number of entrance panels.

FIG. 3 shows an apparatus 3 for powering a plurality of television interphone monitors 30 via a plurality of information transmission lines 16 as another preferred embodiment when applying the present invention to a television interphone monitoring system of a large complex apartment block having multiple entry panels 70B, one or more concierge counters 8 and/or one or more security guards rooms 9.

As seen from FIG. 3, the apparatus for powering a plurality of television interphone monitors 30 comprises a plurality of entrance panels 70B for transmitting and receiving information signals, a single TV camera or a plurality of television cameras 71 for generating video signals, a plurality of current supply units 14 for receiving and transferring the information signals to and from the television interphone monitors 30 and for supplying regulated current to the television interphone monitors 30, a plurality of transmission lines 16 for propagating the information signals between the television interphone monitors 30 and the current supply units 14 and for carrying regulated current from the current supply units 14 to the television interphone monitors 30, a plurality of rechargeable batteries 50 each for providing the energy source needed for operating the respective television monitor circuit 44 of each television interphone monitor 30, a plurality of information transmission lines 16A for propagating the information signals between the current supply units 14 and the entrance unit 4, a plurality of information transmission lines 16B for propagating information signals between the plurality of entrance panels 70B, the concierge counter 8, the security guard room 9 and the entrance unit 4, a selector circuit 91 for connection any of the transmission lines 16A with any of the transmission lines 16B, and a control circuit 101 for controlling selector 91 and for generating control and alarm codes. The control circuit 101 can also generate control commands for controlling the television camera for adjustments and setup of the television camera circuitry or functions or adjust the camera positioning.

Each transmission line 16 corresponds to the number of the current supply units 14, the television interphone monitor 30 and the transmission line 16A, and the information transmission lines 16A are each connected at one end to the respective current supply unit 14 while the other end is connected to a pole of selector circuit 91 which is located at the entrance unit site.

Each information transmission line 16B corresponds to the number of the entrance panels 70B, the concierge counters 8 and the security guard counters or rooms 9. Each of information transmission lines 16B of FIG. 3 is connected at one end to the entrance unit 70B, to the concierge counter 8 and to the security guard room 9, while the other end of each information transmission line 16B is connected to a pole of selector circuit 91. The current supply units 14 shown in FIGS. 1 and 2 can be assembled into the entrance panels 70 (FIG. 1), 70A (FIG. 2), or form an integral part of selector 91 (FIG. 3) or be placed in the entrance unit 4, in such case the information transmission lines 16A become internal connection lines of the entrance panels or an internal line of the entrance unit 4. Each concierge counter 8 and security guard room 9 includes a controller 102, an interphone circuit 6 and a monitor 5.

Figure 6:
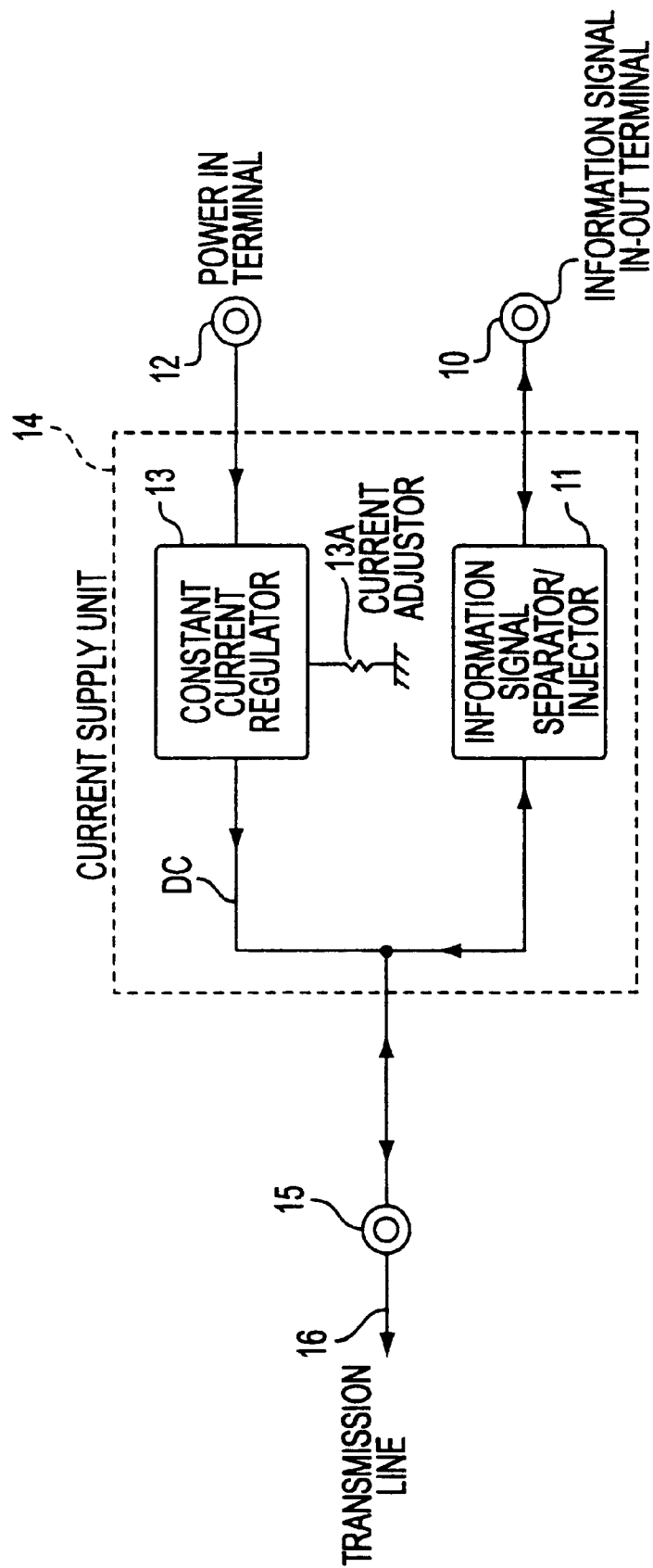
FIG. 6 is a block diagram of an electric circuit of a current supply unit of the apparatus shown in FIGS. 1, 2 and 3.

The current supply unit 14 shown in detail in FIG. 6 is fed by a non-regulated DC power source or rectified AC power source through its input power terminal 12. The current supply unit 14 employs a well known constant current regulator 13 for supplying the television interphone monitor 30 with a regulated current equal to the current consumed by the interphone circuit 45 plus a charge current for charging the rechargeable battery 50 shown FIGS. 1, 2 and 3.

The current for charging the battery can be set to any calculated value by means of a current adjuster 13A shown in FIG. 6 thereby ensuring that the rechargeable battery is sufficiently charged to operate the monitor for precalculated duration. The rechargeable battery 50, such as nickel-cadmium battery having different sizes and power capacity, can be used; alternatively any other type of a rechargeable battery or capacity can be selected. The battery 50 can be installed inside the television interphone monitor housing or at the apartment site and connected via separate power cables to the television interphone monitor 30. The rechargeable battery can also be used for powering the television interphone monitor when power to the current supply units 14 is cut off. The battery capacity and charge current can be selected by calculating the operating time and the monitor power consumption. For example, if the monitor operates on 12V and consumes 500 mA, a 12V battery with 500 mA/hr. capacity can operate the monitor for 1 hr. If the monitor is operated 60 times a day, each time for duration of 1 min, it will consume a total of 500 mA/hr. Therefore, to recharge the battery over 24 hr./day the charge current required for recharging the battery is 500 mA/24 or less than 21 mA.

Figure 4:
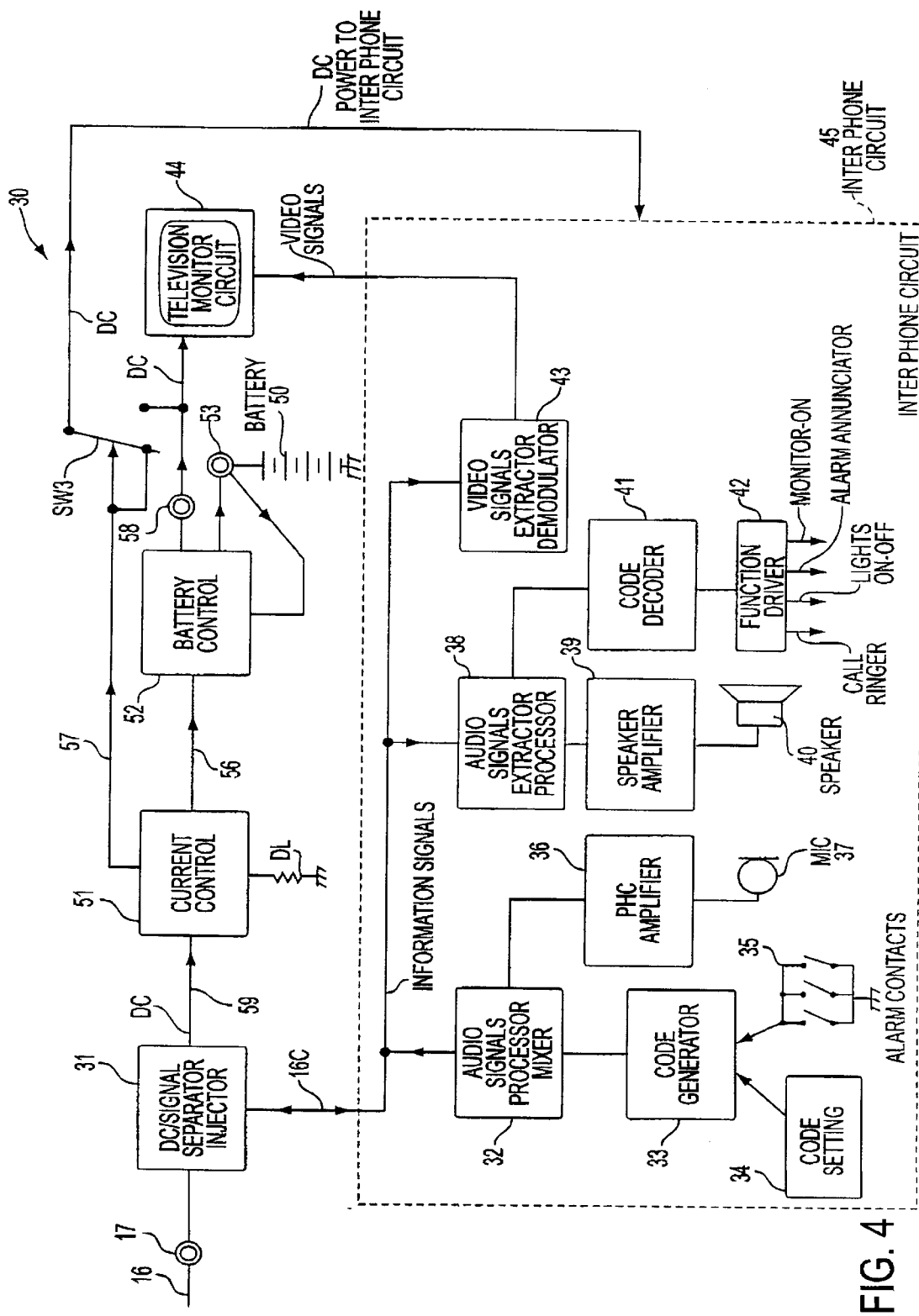
FIG. 4 is a block diagram of an electric circuit of a television interphone monitor of the apparatus shown in FIGS. 1, 2 and 3.
Figure 4A:
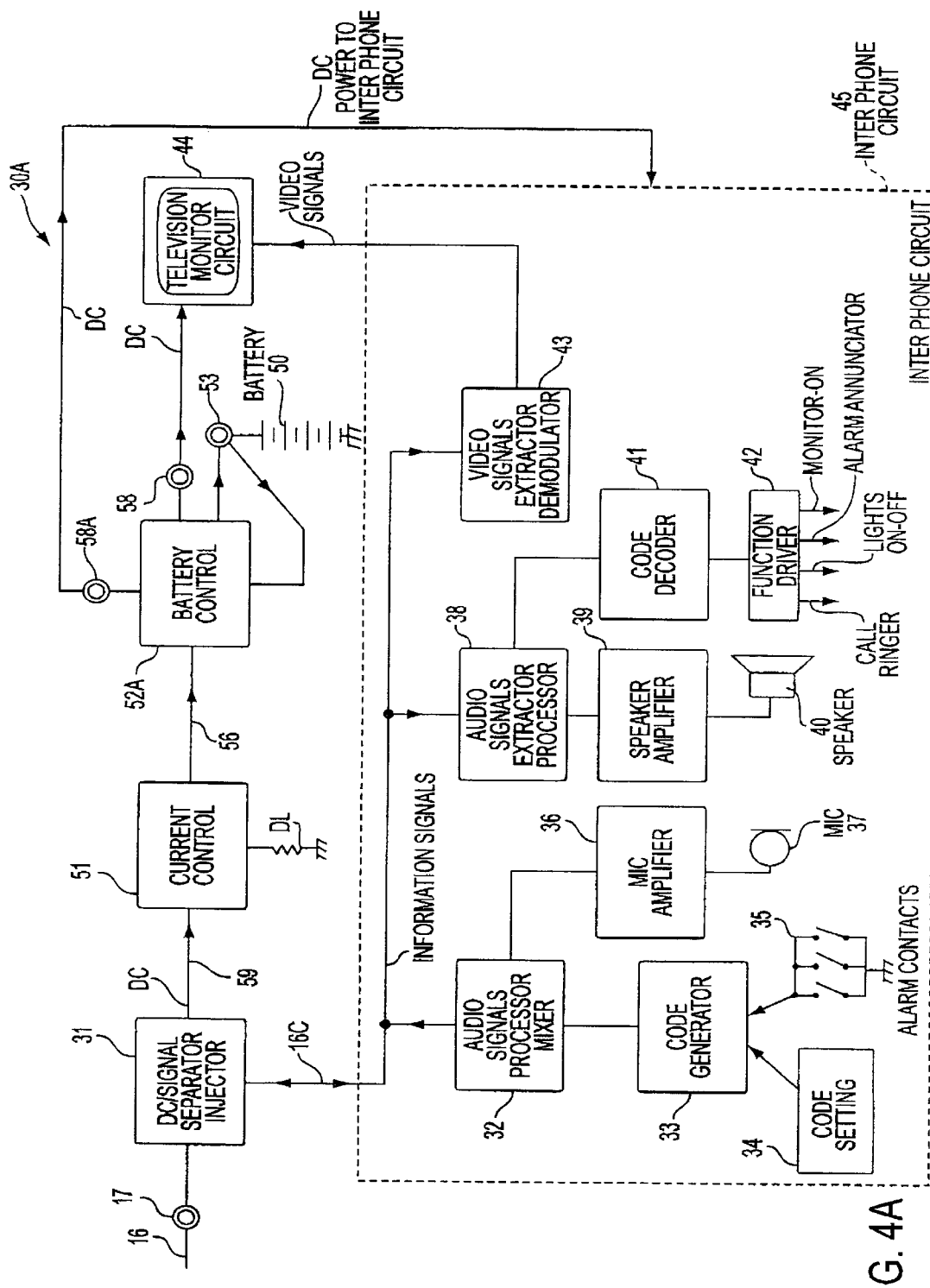
FIG. 4A is a block diagram of another electric circuit of a television interphone monitor of the apparatus shown in FIGS. 1, 2 and 3.

As shown in FIG. 4 and FIG. 4A, the transmission line 16 is connected through a terminal 17 to a DC-signal injector/separator circuit 31 for separating the DC from the received signals. The separator circuit 31 consists of a well known coupling capacitor for coupling the signals and blocking the DC from the signal processing circuits and well known RF filters for removing the signals from the DC. The injector/separator circuit may consist of signal transformers for retrieving information signals from the DC and RF traps for the removal of the information signals from the DC line. The filtered DC line is fed from the injector/separator circuit 31 to a current control circuit 51. The current control circuit 51 incorporates a dummy load DL to replace the battery charge current in the event when the battery polarity is reversely connected to the battery terminal 53 or when the battery 50 is disconnected.

Figure 5:
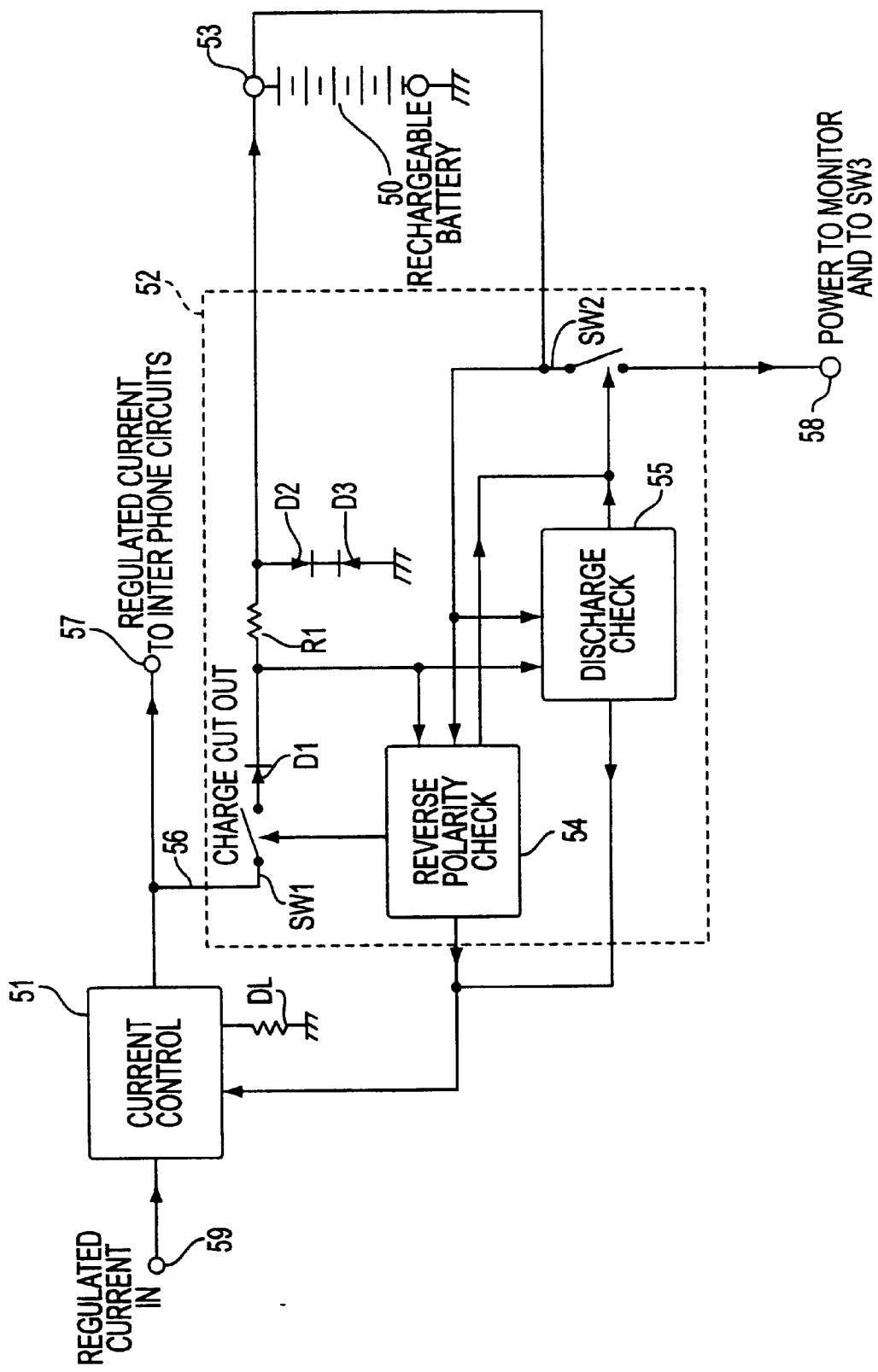
FIG. 5 is a block diagram showing in detail the current and battery control circuits of the electric circuit shown in FIG. 4.
Figure 5A:
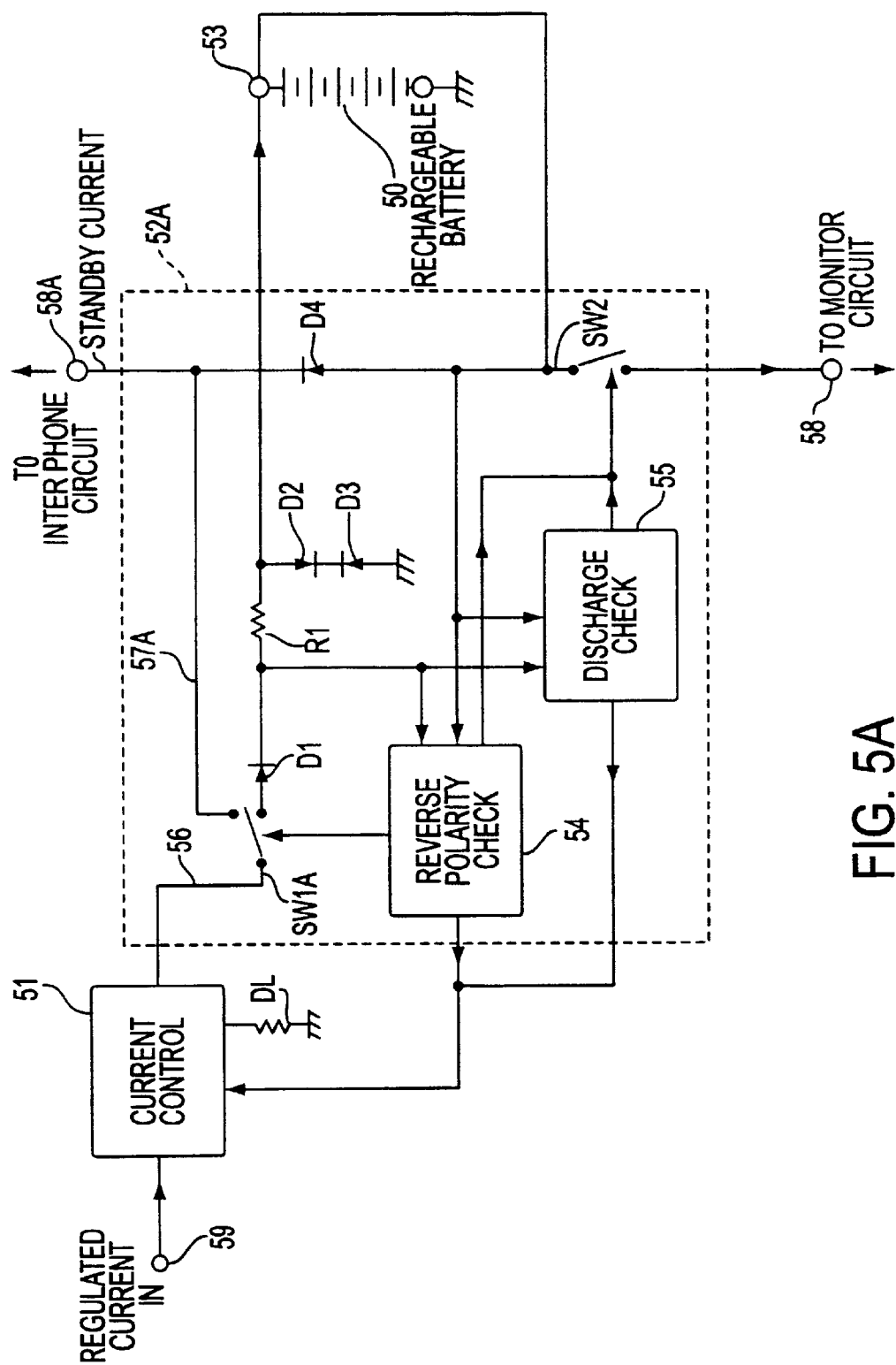
FIG. 5A is a block diagram showing in detail the current and battery control circuits of another embodiment of the electric circuit shown in FIG. 4A.

In the event of reverse battery polarity connections or in the event of battery disconnection there will be no battery charge current and this may cause an over current supply to the interphone circuits 45 by the regulated current fed to the television interphone monitor 30, which may result in damage to the interphone circuits 45. To prevent such damage the current control circuit 51 shown in FIG. 5 and FIG. 5A is fed from the battery control circuit 52 with a "no charge" signal for connecting a dummy load DL to drain a current equal to the charge current, thereby ensuring that the interphone circuits 45 are fed with a proper controlled or standby current.

The current control circuit 51 may employ a switching transistor for connecting the dummy load resistor DL, while the signal for switching the transistor is a high-low signal fed from the battery control circuit 52. As can be seen in FIG. 5, the battery control 52 consists of a discharge check circuit 55 for checking the battery voltage supply, a reverse polarity check circuit 54 for checking the battery polarity connection, a charge cut out switch SW1 for switching the charge current off when the battery polarity is reversely connected, an output switch SW2 for cutting off the output power from the monitor for preventing disturbance to the information signal propagation when the battery is discharged or disconnected, two diodes D1 and D2 for directing the current flow, a charge current limiting resistor R1 and a Zener diode D3 for the over-voltage protection.

The discharge check circuit 55 and the reverse polarity check circuit 54 are fed with references from the charge line 56 and the battery terminal 53 to generate a "shut down" signal to the output switch SW2 when the battery 50 is disconnected or discharged or reversely connected, thereby shutting off the output current to the television monitor circuit 44 to eliminate a random current drain through the charge line 56, thereby preventing disturbance to the information signals flow by a non-stable current drain during a discharged state, a reverse polarity battery connection or a battery disconnection. Similarly, a reversely connected battery is prevented from feeding a wrong polarity output that may damage the television monitor circuit 44. The reverse polarity check circuit 54 also generates a "reverse polarity" signal for switching off the charge switch SW1 to prevent damage to the battery 50 in the event of a reverse polarity connection. D1 diode prevents a reverse unwanted current from the battery to the monitor circuit 44 when the current supply unit 14 is switched off; resistor R1 limits the charge current to the battery, while D2/D3 protect the battery from the over voltage and surges. However, many other well known arrangements and part selection can be made for protecting the battery polarity connection, current direction, current flow, current surge and over voltage protection.

The discharge check circuit 55 and the reverse polarity check circuit 54 may employ a well known differential amplifier or voltage comparator circuits for level detections, while the charge cut out SW1 and the output cutout SW2 switches may employ switching transistors, photo couplers, relays or other well known circuit interrupters. The rechargeable battery 50 shown in FIG. 5 feeds its current through the output cutout switch SW2 to output terminal 58. As shown in FIG. 4 the output terminal 58 is connected to the television monitor circuit 44 for powering the monitor and to a pole of SW3. SW3 is controlled by the controlled current fed to the interphone circuit 45, whereby SW3 switches over and connects the line feeding the power to the interphone circuit 45 from the controlled current line output 57 to the power output terminal 58 when no controlled current is present.

Shown in FIG. 4A is a block diagram of another television interphone monitor 30A of the preferred embodiment in which the interphone circuit 45 is fed with a standby current from the charged battery 50 through a power output terminal 58A of the battery control circuit 52A. Due to this arrangement the SW3 shown in FIG. 4 is not used and the video interphone monitor 30A can be powered by the charged battery 50 when the regulated current is cut off or switched off without the use of SW3. To ensure the correct operation of at least the interphone circuit 45 when the rechargeable battery is disconnected, reversely connected or discharged the battery control circuit 52A shown in FIG. 5A comprises an additional diode D4 for directing the current from the battery terminal 53 to the standby current supply terminal 58A. The diode D4 prevents a reverse polarity current in the event that the battery is reversely connected or discharged. All the other circuits of the battery control circuits 52A are similar to the circuits of battery control circuit 52 of FIG. 5, with the exception of a charge cutout switch SW1A which has the switch-over function shown in FIG. 5A. When the battery 50 is disconnected or reversely connected the charge cutout switch SW1A will trip and switch over to connect the output terminal 58A through a line 57A for supplying controlled current which is equal to the standby current for operating the interphone circuit 45. Here, too many other arrangements and part selections can be made for protecting the battery polarity connection, current direction, current flow, current surge and over-voltage protection.

The selector 90 shown in FIG. 2 is a selector switch which can be composed of relays or of well known IC multiplexer switches or other known electronic switching devices. The selector circuit 91 shown in FIG. 3 can be composed of a plurality of switches corresponding to the plurality of information transmission lines 16A and transmission line 16B for connecting information signals propagated between the plurality of television interphone monitors 30 and any one or all of the entrance panels 70B, concierge counters 8 and security guard rooms 9.

Thereby, any one or more information signals propagated through the information transmission lines 16 can be selected and fed from the selection circuit 91 to any of the information transmission lines 16B. In FIG. 3 selector 91 is shown as a mechanical selector switch, however the selector 91 can be a well known ICs such as an electronic multiplexer or a matrix switch, with multiple outputs for independent selections of any input into any output.

Figure 7:
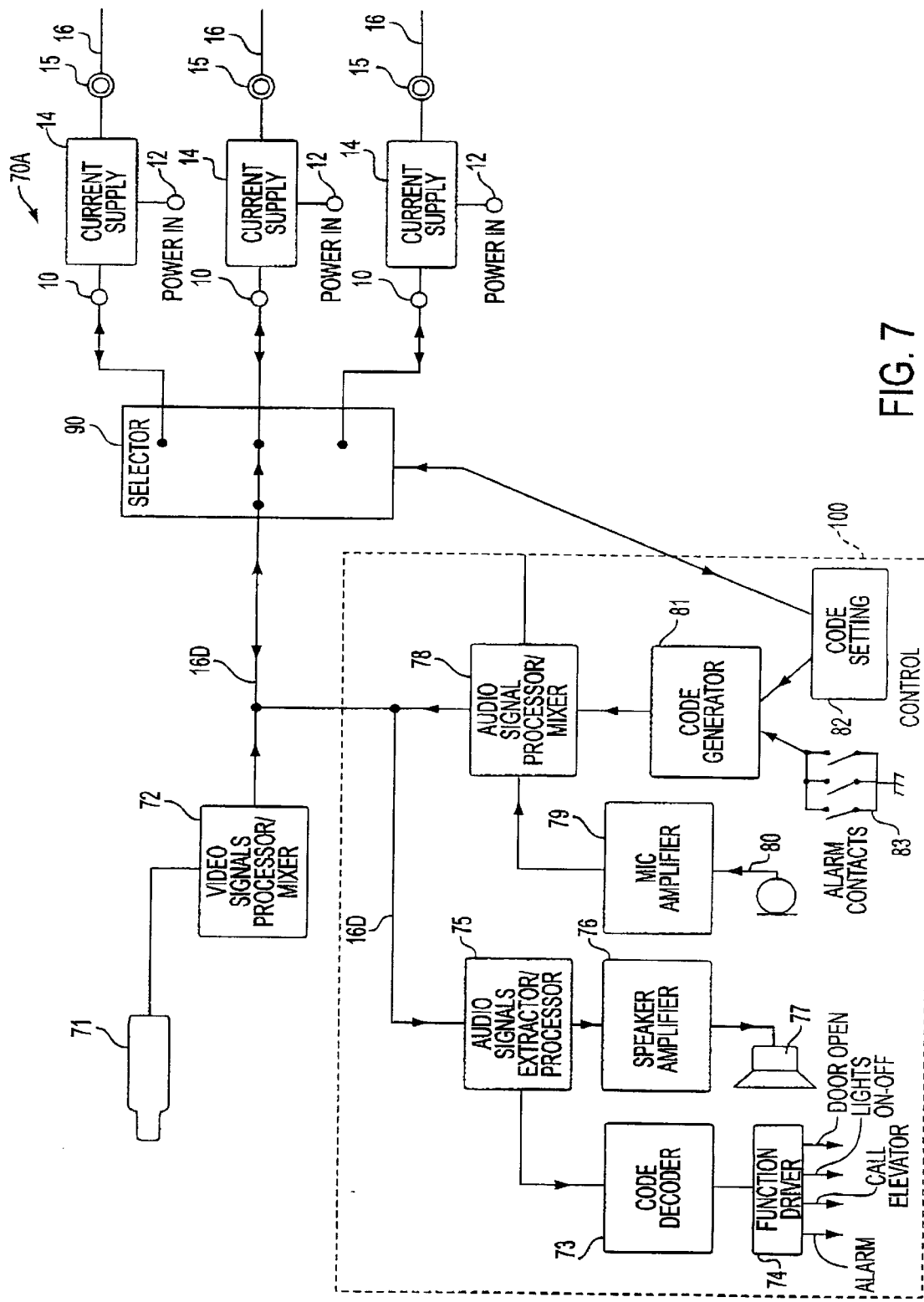
FIG. 7 is a block diagram of an electric circuit showing an entrance unit of the apparatus shown in FIG. 3.

The controllers 100 of entrance panels 70, 70A and 70B shown in FIG. 1, FIG. 2 and FIG. 3, respectively, and the controller 101 of the entrance unit 4 and the controllers 102 of the concierge counter 8 and/or the security guard counter 9 of FIG. 3 are essentially identical and one of them is shown in detail in FIG. 7. However, the controller 100 shown in FIG. 7 of the entrance panel 70A of FIG. 2 and the controller 100 of entrance panel 70B of FIG. 3 generate a selection signal for connecting a single television interphone monitor 30 through the selector 90 of FIG. 2 or through a single gang selector portion of selector 91 of FIG. 3, while the controller 101 of entrance unit 4, and controllers 102 of the concierge counter 8 and the security guard counter 9 of FIG. 3 can generate simultaneous selection signals for connecting a plurality of television interphone monitors 30 with a plurality of entrance panels 70B, concierge counters 8 and security guard rooms 9 through selector 91. The controller 100 of FIG. 1 does not provide selection signals since the entrance panel 70 does not incorporate a selector.

The controller 100 of FIG. 2 and the controller 101 of FIG. 3 each employs a microprocessor or a digital circuit using a well known microprocessor or digital ICs for generating selector selection signals and control signals or alarm signals for operating the television interphone system. Similarly the controller 100 or controller 101 may use a well known microprocessor operated by a personal computer programmed for generating selector selection signals and control signals or alarm signals for operating the television interphone systems of FIG. 2 and FIG. 3. The control and alarm signals generated by the controllers 100 of FIGS. 1, 2 and 3 or by the controller 101 and 102 of FIG. 3 are coded commands such as for activating a ringer, switching on the monitor, switching on-off the light or calling the elevator into a given floor. Similarly a code may be generated for controlling the selector via the transmission line 16B of FIG. 3. Such control code may also combine the apartment number or use a combination of the entrance, the floor and the apartment number for addressing or operating the selectors 90 of FIG. 2 or 91 of FIG. 3. The selector selection signals generated by the controller 100 of FIG. 2 and controllers 100, 101 or 102 of FIG. 3 are directly supplied to the selector 90 or 91 for operating the selector, while the control command codes for operating the television interphone monitoring system are injected into the transmission line 16 via lines 16D of FIG. 7 or 16B of FIG. 3.

Referring again to FIG. 4, the interphone circuit 45 of the television interphone monitor 30 includes a code setting circuit 34 for setting control codes similar to the command codes generated by controller 100 or controller 101, such as opening the door lock or calling the elevator into a given floor or switching the lights on-off and/or code for operating the selector 90 of FIG. 2 or 91 of FIG. 3. The alarm contacts 35 of the interphone circuit 45 shown in FIG. 4 and in FIG. 4A will set an alarm command code when activated manually or automatically through peripheral alarm equipment such as a burglar alarm. The interphone circuit 45 also has a code signal generator 33 which consists of dual-tone dialer IC for generating well known dial-tone frequencies used for telephone networks and feed the coded control signals consisting of dual tone frequencies to an audio signal processor/mixer 32 for mixing the coded control signals with the audio signal and injects the signals into the transmission line 16 via the DC-signal injector/separator circuit 31. The DC-signal injector/separator circuit 31 injects the mixed audio signals via the well known coupling capacitor or signal transformer. It may also use well known transistor/buffer amplifier circuits for feeding the mixed signal into the transmission line 16.

The code signal generator 33 of the interphone circuit 45 may consist of a digital pulse generator for transmitting digital pulse signals commensurate with the selected code, in which case the audio signal processor mixer 32 may generate pulse signals within the audio frequdncy bandwidth for mixing the digital pulses with the audio signals and for injecting the mixed audio signal into the transmission line 16 via the DC-signal injector/separator 31. The interphone circuit 45 also includes a microphone amplifier 36 coupled between the microphone 37 and the mixer 32, an audio signal extractor processor 38, a speaker amplifier 39 coupled to a speaker 40, a code decoder 41 coupled to a function driver 42 and a video signal extractor demodulator 43, the functions of which will be explained below.

As shown in FIG. 7, the controller 100 of the entrance panel 70A includes a code setting circuit 82 for setting control codes similar to the command codes generated by the code setting circuit 34 of FIG. 4 such as activating a ringer, or opening the door lock or calling the elevator into a given floor or switching the lights on-off, alarm contacts 83 for setting an alarm command code which can be activated manually or automatically through peripheral alarm equipment such as burglar alarm, and a code signal generator 81 consisting of a dual-tone dialer IC for generating well known dial-tone frequencies used for telephone networks. The coded control signals consisting of a single or a group of dual tone frequencies are fed from the code signal generator 81 to an audio signal processor/mixer 78 for mixing the coded control signals with the audio signals and for injecting the signals into transmission line 16 via the DC-signal injector/separator circuit 11 of the current supply unit 14 shown in FIG. 6. The DC-signal injector/separator circuit 11 injects the mixed audio signals via a well known coupling capacitor or signal transformer. It may also use well known transistor/buffer amplifier circuits for feeding the mixed signals into the transmission line 16.

The code signal generator 81 shown in FIG. 7 may consist of a digital pulse generator for transmitting digital pulse signals commensurate with the selected code, in which case the audio signal processor mixer 78 may generate pulse signals within the audio frequency bandwidth for mixing the pulse signals with the audio signals and for injecting the mixed audio signal into the transmission line 16 via the DC-signal injector/separator 11 of the current supply unit 14 shown in FIG. 6.

The audio signal extractor processor 38 of the circuit 45 shown in FIG. 4 extracts the audio signal from the information signals. The code decoding circuit 41 decodes the control codes fed from the audio signal extractor/processor 38 and the function driver 42 drives the call ringer or switches the lights on-off or activates an alarm. The code decoder 41 consist of a dual-tone decoder IC for decoding the well known dial-tone frequencies used for telephone networks and feeds the decoded control signals to the function driver 42. The function driver 42 consists of electronic switching/driving devices such as transistors or multiplexers ICs, or relays, or photo couplers or other well known switching/driving devices.

The audio signal extractor/processor 38 extracts the audio signal from the information signals by using well known low pass filters for extracting the lower frequency audio signals from the information signals fed from the information signal line 16C. The extracted audio signals are also fed to the speaker amplifier 39 and to the speaker 40. The microphone 37, microphone amplifier 36, speaker 40 and speaker amplifier 39 use well known audio components for amplifying the received audio signals and the microphone audio signals. The microphone amplifier 36 feeds the microphone signals to the audio signal processor/mixer for feeding the mixed audio and microphone signals through the information signal line 16C to the DC-signal separator/injector 31 for injecting the mixed audio and microphone signals to the transmission line 16.

If the coded control signals generated by the code signal generator 33 of circuit 45 shown in FIG. 4 or the code signal generator 81 shown in FIG. 7 are digital signals or pulse signals within the audio frequencies range the code decoder 41 shown in FIG. 4 and the code decoder 73 shown in FIG. 7 will employ a well known band pass filter for extracting the digital signal or pulse signals and a digital decoder for decoding the coded signals.

It is apparent from the above description that the two-way audio signals generated by the entrance panels 70A shown in FIG. 7 and the audio signals generated by the television interphone monitor 30 can be propagated along with two-way control signals and alarm signals between the television interphone entrance panel and the television interphone monitor via transmission line 16 that carries regulated current to operate the interphone circuits 45 of the television interphone monitor 30 and a charge current to charge the rechargeable battery 50 for operating the television monitor circuit 44 of the television interphone monitor 30 without disturbing the information signals by the random current drain and/or current surges caused by random activation of the monitor. It is also apparent that the television interphone monitor itself can be operated by the associated battery when the regulated current supply is cut off.

As shown in FIG. 7, the well known television camera 71 feeds composite video signals to the video signal processor mixer 72. The video signal processor mixer uses well known frequency modulation IC to modulate the composite video signals onto a carrier frequency which keeps the lower frequency range of the modulated video signal above the upper frequency range of the audio signals thereby permitting the video signals to be injected into a common transmission line 16d used for the audio signals without disturbing the audio signals. In the preferred embodiment the video signal processor mixer 72 may further comprise a well known differential signal converter I.C for converting the modulated video signals into different signals and feeding the differential signals into the transmission line 16d and into the information transmission line 16 via selector 90 and current supply unit 14.

The video signal extractor/processor 43 of the interphone circuit 45 shown in FIG. 4 extracts from line 16C the frequency modulated video signals or the differential signals by using a well known band pass filter and demodulates the extracted video signal by using well known ICs and other peripheral components to feed the television monitor circuits 44 with the demodulated composite video signal for displaying the image of the visitor at the entrance onto the screen of the television monitor circuit 44.

It has also been apparent from the above description that information signals composed of the video signal along with audio signal, control signals and alarm signals are transmitted from the entrance panel and/or the entrance unit to the television interphone monitor through a common transmission line.

The controller 102 of the concierge counter 8 and the controller 102 of the security guard room 9, shown in FIG. 3 can receive control data from the controller 101 and selector 91 and transmit overriding control and selector select signals to the controller 101 and the selector 91. A signal fed from the selector 91 to the controller 101 or controllers 102 contains switching-on or switching-over data which provide the security guards and the concierge with information and status of visitors, callers and alarm.

The interphone circuits 6 of the concierge counter 8 and of the security guard room 9 are identical to the interphone circuit 45 of the monitor 30 of FIG. 4 while the monitor circuits 5 can be similar to the television monitor circuit 44 also shown in FIG. 4 or any other television monitor circuit. Accordingly, it is possible for the concierge counter 8 or the security guard room 9 to receive audio signals, control signals or alarm signals or transmit audio signals, control signals and alarm signals to any individual television interphone monitor 30, or to receive audio signals, control signals or alarm signals and video signals from any of the entrance panels 70B, and transmit audio control and/or alarm signals to any of the entrance panels 70B. Such arrangement permits the concierge or the security guard to communicate with each tenant or visitor, or interfere in case of emergency into visitor-to-tenant calls.

According to the apparatus for powering a television monitor interphone via common transmission lines shown in FIGS. 1, 2 and 3, the television interphone monitors can be powered through their respective transmission lines and connect to the entrance panel, or entrance unit, or to a concierge or to a security guard by a simple apparatus in an arbitrary combination with each other, whereby, one, two or any arbitrary entrance panels can be connected to a plurality of arbitrary television interphone monitors through the transmission lines connecting the television interphone monitor and via the current supply units.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. An apparatus for powering a television interphone monitor via an information signal transmission line, the apparatus comprising:

a television interphone monitor including a television monitor circuit adapted to operate by a rechargeable battery and an interphone circuit adapted to drain from said rechargeable battery a standby current, for receiving and processing first multiplexed electrical information signals including video signals, audio signals, control signals and also alarm signals in case of an alarm and for processing and outputting second multiplexed electrical information signals including audio signals, control signals and also alarm signals in case of an alarm;

a television interphone entrance panel for receiving and processing said second multiplexed electrical information signals and for processing and outputting said first multiplexed electrical information signals;

a television camera for generating composite video signals or digital video signals and for feeding said video signals to said television interphone entrance panel;

a rechargeable battery connected to said television interphone monitor for powering said television interphone monitor;

a regulated current supply means for supplying said television interphone monitor with a regulated current and for propagating said first and second multiplexed electrical information signals from said television interphone entrance panel to said television interphone monitor and from said television interphone monitor to said television interphone entrance panel;

a transmission line for connecting said television interphone monitor with said regulated current supply means for feeding said rechargeable battery with said regulated current and for propagating said first and second multiplexed electrical information signals through said regulated current supply means;

an information signal transmission line for connecting said television interphone entrance panel with said regulated current supply means for propagating said first and second multiplexed electrical information signals through said regulated current supply means, wherein said regulated current is equal to the sum of said standby current and a current fed to charge said rechargeable battery and wherein the charged battery provides the power needed to operate said television interphone monitor.

2. An apparatus for powering television interphone monitor via information signal transmission line, comprising:

a television interphone monitor including an interphone circuit and a television monitor circuit and adapted to operate said interphone circuit by a controlled current, for receiving and processing first multiplexed electrical information signals including video signals, audio signals, control signals and also alarm signals in case of an alarm and for processing and outputting second multiplexed electrical information signals including audio signals, control signals and also alarm signals in case of an alarm;

a rechargeable battery connected to said television interphone monitor for powering said television monitor circuit of said television interphone monitor;

a television interphone entrance panel for receiving and processing said second multiplexed electrical information signals and for processing and outputting said first multiplexed electrical information signals;

a television camera for generating composite video signals or digital video signals and for feeding said video signals to said television interphone entrance panel;

a regulated current supply means for supplying said television interphone monitor with a regulated current and for propagating said first and second multiplexed electrical information signals from said television interphone entrance panel to said television interphone monitor and from said television interphone monitor to said television interphone entrance panel;

a transmission line for connecting said television interphone monitor with said regulated current supply means for feeding said television interphone monitor with said regulated current and for propagating said first and second multiplexed electrical information signals through said regulated current supply means;

an information signal transmission line for connecting said television interphone entrance panel with said regulated current supply means for propagating said first and second multiplexed electrical information signals through said regulated current supply means, wherein said regulated current is equal to the sum of said controlled current operating said interphone circuit and a current fed to charge said rechargeable battery and wherein the charged battery provides the power needed to operate said television monitor circuit.

3. The apparatus according to claim 2, wherein said controlled current fed to said interphone circuit from said regulated current supply means is switched over to be fed from said rechargeable battery when power from said regulated current supply means is cut off or switched off.

4. The apparatus according to claim 1, wherein said regulated current supply means is included in said television interphone entrance panel and wherein said information signal transmission line is an internal connecting line of the apparatus.

5. The apparatus according to claim 2, wherein said regulated current supply means is included in said television interphone entrance panel and wherein said information signal transmission line is an internal connecting line of the apparatus.

6. An apparatus for powering a television interphone monitor via an information signal transmission line, the apparatus comprising:

a plurality of television interphone monitors each including a television monitor circuit adapted to operate by a rechargeable battery and an interphone circuit adapted to drain from said rechargeable battery a standby current, for receiving and processing first multiplexed electrical information signals including video signals, audio signals, control signals and also alarm signals in a case of an alarm and for processing and outputting second multiplexed electrical information signals including audio signals, control signals and also alarm signals in case of an alarm;

a television interphone entrance panel including a selector switch for selectively receiving, processing and outputting said first and second multiplexed electrical information signals;

a television camera for generating composite video signals or digital video signals and for feeding said video signals to said television interphone entrance panel;

a plurality of rechargeable batteries each connected to each of said plurality of television interphone monitors for powering said television interphone monitors;

a plurality of regulated current supply means for supplying each of said plurality of rechargeable batteries with regulated current and for propagating said first and second multiplexed electrical information signals from said television interphone entrance panel to each of said television interphone monitors and from each of said television interphone monitors to said television interphone entrance panel;

a plurality of transmission lines for connecting each of said plurality of television interphone monitors with each of said plurality of regulated current supply means, for feeding each of said plurality of television interphone monitors with said regulated current and for propagating said first and second multiplexed electrical information signals through said regulated current supply means;

a plurality of information signal transmission lines for connecting each of said plurality of regulated current supply means with a respective pole of said selector switch of said television interphone entrance panel for propagating said first and second multiplexed electrical information signals through said regulated current supply means, wherein said regulated current is equal to the sum of said standby current and a current fed to charge each of said rechargeable batteries and wherein the charged battery provides the power needed to operate each of said television interphone monitor.

7. An apparatus for powering a television interphone monitor via an information signal transmission line, the apparatus comprising:

a plurality of television interphone monitors each including an interphone circuit and a television monitor circuit and adapted to operate said interphone circuit by a controlled current, for receiving and processing first multiplexed electrical information signals including video signals, audio signals, control signals and also alarm signals in a case of an alarm and for processing and outputting second multiplexed electrical information signals including audio signals, control signals and also alarm signals in a case of an alarm;

a television interphone entrance panel including a selector switch for selectively receiving, processing and outputting said first and second multiplexed electrical information signals;

a television camera for generating composite video signals or digital video signals and for feeding said video signals to said television interphone entrance panel;

a plurality of regulated current supply means for supplying each of said plurality of television interphone monitors with said regulated current and for propagating said first and second multiplexed electrical information signals from said television interphone entrance panel to each of said television interphone monitors and from each of said television interphone monitor to said television interphone entrance panel;

a plurality of rechargeable batteries each connected to each of said plurality of television interphone monitors for powering said television monitor circuit of each of said plurality of television interphone monitors;

a plurality of transmission lines for connecting each of said plurality of television interphone monitors with each of said plurality of regulated current supply means for feeding each of said plurality of television interphone monitors with said regulated current and for propagating said first and second multiplexed electrical information signals through said regulated current supply means;

a plurality of information signal transmission lines for connecting each of said plurality of regulated current supply means with a respective pole of said selector switch of said television interphone entrance panel for propagating said first and second multiplexed electrical information signals through said regulated current supply means, wherein said regulated current is equal to the sum of said controlled current operating each of said interphone circuit and a current fed to charge each of said rechargeable batteries and wherein the charged battery provides the power needed to operate each of said television monitor circuit.

8. The apparatus according to claim 7, wherein said controlled current fed to said interphone circuit from said regulated current supply means is switched over to be fed from said rechargeable battery when power from said regulated current supply means is cut off or switched off.

9. The apparatus according to claim 6, wherein the plurality of said regulated current supply means are included in said television interphone entrance panel and wherein the plurality of said information signal transmission lines are internal connecting lines of the apparatus.

10. The apparatus according to claim 7, wherein the plurality of said regulated current supply means are included in said television interphone entrance panel and wherein the plurality of said information signal transmission lines are internal connecting lines of the apparatus.

11. An apparatus for powering a television interphone monitor via an information signal transmission line, the apparatus comprising:

a plurality of television interphone monitors each including a television monitor circuit adapted to operate by a rechargeable battery and an interphone circuit adapted to drain from said rechargeable battery a standby current, for receiving and processing first multiplexed electrical information signals including video signals, audio signals, control signals and also alarm signals in a case of an alarm and for processing and outputting second multiplexed electrical information signals including audio signals, control signals and also alarm signals in a case of an alarm;

at least one television interphone entrance panel for receiving, processing and outputting said first and second multiplexed electrical information signals;

at least one television camera for generating composite video signals or digital video signals and for feeding said video signals to said at least one television interphone entrance panel;

at least one of a concierge counter and/or security guard counters for receiving, processing and outputting said first and second multiplexed electrical information signals;

an entrance unit including a selector switch and a controller for arbitrarily connecting any of said television interphone monitors with any of said at least one television interphone entrance panel, said concierge counter and/or said security guard counter and for arbitrarily connecting any of said concierge counter and said security guard counters with said at least one television interphone entrance panel;

a plurality of rechargeable batteries each connected to each of said plurality of television interphone monitors for powering said television interphone monitors;

a plurality of regulated current supply means for supplying each of said plurality of rechargeable batteries with said regulated current and for propagating said first and second multiplexed electrical information signals from said selector switch to each of said television interphone monitors and from each of said television interphone monitors to said selector switch;

a plurality of transmission lines for connecting each of said plurality of television interphone monitors with each of said plurality of regulated current supply means for feeding each of said plurality of television interphone monitors with said regulated current and for propagating said first and second multiplexed electrical information signals through said regulated current supply means;

a plurality of first information signal transmission lines for connecting each of said plurality of regulated current supply means with a respective pole of said selector switch of said entrance unit for propagating said first and second multiplexed electrical information signals through said regulated current supply means;

a plurality of second information transmission lines for connecting said at least one television interphone entrance panel with at least one of said concierge counter and/or said security guard counter with a respective pole of said selector switch of said entrance unit for propagating said first and second multiplexed electrical information signals to and from said at least one television interphone entrance panel and said at least one of said concierge counter and/or said security guard counters to and from said selector switch, wherein said regulated current is equal to the sum of said standby current and a current fed to charge each of said rechargeable batteries and wherein the charged battery provides power needed to operate said television interphone monitors.

12. The apparatus according to claim 11, wherein the plurality of said regulated current supply means are included in said entrance unit and the plurality of said first information signal transmission lines are internal connecting lines of the apparatus.

13. An apparatus for powering a television interphone monitor via an information signal transmission line, the apparatus comprising:

a plurality of television interphone monitors each including an interphone circuit and a television monitor circuit and adapted to operate said interphone circuit by a controlled current, for receiving and processing first multiplexed electrical information signals including video signals, audio signals, control signals and also alarm signals in a case of an alarm and for processing and outputting second multiplexed electrical information signals including audio signals, control signals and also alarm signals in a case of an alarm;

a plurality of television interphone entrance panels for receiving, processing and outputting first and second multiplexed electrical information signals;

at least one television camera for generating composite video signals or digital video signals and for feeding said video signals to at least one of said plurality of television interphone entrance panels;

an entrance unit including a selector switch and a controller for arbitrary connecting any of said television interphone monitors with any of said television interphone entrance panels;

a plurality of rechargeable batteries each connected to each of said plurality of television interphone monitors for powering said television monitor circuit of each of said plurality of television interphone monitors;

a plurality of regulated current supply means for supplying each of said plurality of television interphone monitors with said regulated current and for propagating said first and second multiplexed electrical information signals from said selector switch to each of said television interphone monitors and from each of said television interphone monitor to said selector switch;

a plurality of transmission lines for connecting each of said plurality of television interphone monitors with each of said plurality of regulated current supply means for feeding each of said plurality of television interphone monitors with said regulated current and for propagating said first and second multiplexed electrical information signals through said regulated current supply means;

a plurality of information signal transmission lines for connecting each of said plurality of regulated current supply means with a respective individual pole of said selector switch of said entrance unit for propagating said first and second multiplexed electrical information signals through said regulated current supply means;

wherein said regulated current is equal to the sum of said controlled current operating each of said interphone circuits and a current fed to charge each of said rechargeable batteries and wherein the charged battery provides power needed to operate each said television monitor circuit.

14. The apparatus according to claim 13, wherein said controlled current fed to said interphone circuit from said regulated current supply means switches over to be fed from said rechargeable battery when the power from said regulated current supply means is cut or switched off.

15. The apparatus according to claim 13, wherein the plurality of said regulated current supply means are incorporated in said entrance unit and wherein the plurality of said information signal transmission lines are internal connecting lines of the apparatus.

16. The apparatus according to claim 1, and further comprising:

control means, coupled with said television interphone monitor and said television interphone entrance panel, for generating coded control signals and alarm signals using dual-tone or digital pulses within an audio frequency range and injecting said coded control signals and alarm signals respectively into said transmission line and said information transmission line, wherein said control means includes a receiving circuit for receiving said coded control signals and alarm signals through an associated one of said transmission line or said information transmission line and a decoding circuit for decoding said control signals received thereby and feeding the decoded control signals and alarm signals to a driving circuit for operating said television interphone monitor or said television interphone entrance panel in accordance with said controls or said alarm signals.

17. An apparatus according to claim 1, and further comprising:

a video signal processor means, coupled with said television interphone entrance panel, for modulating video signals on a carrier, having the lowest modulated frequency thereof higher than an audio frequency bandwidth, and a processing circuit to process the modulated video signals into differential signals for feeding said differential signals into said information transmission line, said television interphone monitor further comprising a circuit for receiving said differential signals and for demodulating said received differential signals and feeding the demodulated signals to a monitor circuit for displaying a video picture on the basis of said demodulated signals.

18. The apparatus according to claim 2, and further comprising:

control means, coupled with said television interphone monitor and said television interphone entrance panel, for generating coded control signals or alarm signals using dual-tone or digital pulses within the audio frequency range and injecting the said coded control signals or alarm signals respectively into said transmission line and said information transmission line;

said control means further including a receiving circuit for receiving at least one of said coded control signals and alarm signals through an associated one of said transmission line and said information transmission line, and a decoding circuit for decoding said control signals received thereby and feeding the decoded signals of said at least one of control signals and alarm signals to a driving circuit for operating said television interphone monitor or said television interphone entrance panel in accordance with said control signals and said alarm signals.

19. The apparatus according to claim 2, and further comprising:

a video signal processor means, coupled with said television interphone entrance panel for modulating video signals on a carrier, having the lowest modulated frequency thereof higher than an audio frequency bandwidth, and a processing circuit to process the modulated video signals into differential signals for feeding said differential signals into said information transmission line, said television interphone monitor further comprising a receiving circuit for receiving said differential signals and demodulating said differential signals received thereby and feeding the demodulated signals to a monitor circuit for displaying a video picture on the basis of said demodulated signals.

20. The apparatus according to claim 6, and further comprising:

a plurality control means, coupled with each of said television interphone monitors and with said television interphone entrance panel, for generating coded control signals and alarm signals using dual-tone or digital pulses within an audio frequency range and injecting said coded control signals and alarm signals respectively into said transmission line and said information transmission line;

each of said control means further including a receiving circuit for receiving said coded control signals and alarm signals through an associated one of said transmission line and said information transmission line, and a decoding circuit for decoding said control signals received thereby and feeding the decoded control signals and alarm signals to a driving circuit for operating said television interphone monitor or said television interphone entrance panel on the basis of said control and alarm signals.

21. The apparatus according to claim 6, and further comprising:

a video signal processor means, coupled with said television interphone entrance panel, for modulating video signals on a carrier, having the lowest modulated frequency thereof higher than an audio frequency bandwidth, and a processing circuit to process the modulated video signals into differential signals for feeding said differential signals into said information transmission line, each of said television interphone monitors further comprising a receiving circuit for receiving said differential signals and for demodulating said received differential signals and feeding the demodulated signals to a monitor circuit for displaying a video picture on the basis of said demodulated signals.

22. The apparatus according to claim 7, and further comprising:

a plurality of control means, coupled with each of said television interphone monitors and said television interphone entrance panel, for generating coded control signals and alarm signals using dual-tone or digital pulses within an audio frequency range and injecting said coded control signals and alarm signals respectively into said transmission line and said information transmission line;

each of said control means further including a receiving circuit for receiving said coded control signals and alarm signals through an associated one of transmission lines or said information transmission lines, and a decoding circuit for decoding said signals received thereby and feeding the decoded control signals and alarm signals to a driving circuit for operating each of said television interphone monitor or said television interphone entrance panel in accordance with said control signals and alarm signals.

23. The apparatus according to claim 7, and further comprising:

a video signal processor means, coupled with said television interphone entrance panel, for modulating video signals on a carrier, having the lowest modulated frequency thereby higher than an audio frequency bandwidth, and a processing circuit to process the modulated video signals into differential signals for feeding said differential signals into said information transmission line, each of said television interphone monitors further comprising a receiving circuit for receiving said differential signals and for demodulating the received differential signals and feeding the demodulated signals to a monitor circuit for displaying a video picture on the basis of said demodulated signals.

24. The apparatus according to claim 11, and further comprising:

a plurality of control means each coupled with each of said television interphone monitors and with each of said television interphone entrance panels and with each of said concierge counters and each of said security guard counters, for generating coded control signals and alarm signals using dual-tone or digital pulses within an audio frequency range and injecting said coded control signals and alarm signals respectively into said transmission line and said information transmission line;

each of said control means further including a receiving circuit for receiving said coded control signals and alarm signals through an associated one of said transmission lines or said information transmission lines and a decoding circuit for decoding the received signals and feed the decoded control and/or alarm signals to a driving circuit for operating said each television interphone monitor or said each television interphone entrance panel and/or said each concierge counter and/or said each security guard counter on the basis of said control and/or alarm signals.

25. The apparatus according to claim 11, and further comprising:

a video signal processor means, coupled with each of said television interphone entrance panels, for modulating video signals on a carrier, having the lowest modulated frequency thereof higher than an audio frequency bandwidth, and a processing circuit to process the modulated video signals into differential signals for feeding said differential signals into said information transmission line, each of said television interphone monitors further comprising a receiving circuit for receiving said differential signals and demodulating the received differential signals and feeding the demodulated signals to a monitor circuit for displaying a video picture on the basis of said demodulated signals.

26. The apparatus according to claim 12, and further comprising:

a plurality of control means, coupled with each of said television interphone monitor and with each of said television interphone entrance panels and with at least one of each of said concierge counters and each of said security guard counters for generating coded control and alarm signals using dual-tone or digital pulses within an audio frequency range and injecting said coded control and alarm signals respectively into said transmission line and said information transmission line;

each of said control means further including a receiving circuit for receiving said coded control and alarm signals through one of an associated transmission line and information transmission line, and a decoding circuit for decoding the received signals and feeding the decoded control and/or alarm signals to a driving circuit for operating said each television interphone monitor or said each television interphone entrance panel and at least one of said each concierge counter and said each security guard counter on the basis of said control and alarm signals.

27. The apparatus according to claim 12, and further comprising:

a video signal processor means, coupled with each of said television interphone entrance panels, for modulating video signals on a carrier, having the lowest modulated frequency thereof higher than an audio frequency bandwidth, and a processing circuit to process the modulated video signals into differential signals for feeding said differential signals into said information transmission line, each of said television interphone monitors further comprising a receiving circuit for receiving said differential signals and demodulating the received differential signals and feeding the demodulated signals to a monitor circuit for displaying a video picture on the basis of said demodulated signals.

* * * * *